July 1, 1947.　　　G. WINKLER　　　2,423,134

ACCUMULATOR CHARGING SYSTEM

Filed Dec. 6, 1944

Inventor

Gunnar Winkler

Patented July 1, 1947

2,423,134

UNITED STATES PATENT OFFICE 2,423,134

ACCUMULATOR CHARGING SYSTEM

Gunnar Winkler, Appelviken, Stockholm, Sweden, assignor to International Standard Electric Corporation, New York, N. Y.

Application December 6, 1944, Serial No. 566,890
In Sweden December 8, 1943

6 Claims. (Cl. 320—39)

This invention relates to systems for charging accumulator batteries from A. C. supplies over rectifiers comprising an impedance combination for regulating the charging current between suitable maximum and minimum values.

The main object of the invention is to provide a simple and cheap system of this kind presenting high efficiency.

With this and other objects in view the invention consists in the novel combination and arrangement of elements hereinafter fully described, illustrated in the accompanying drawing and pointed out in the claims hereunto appended.

Figure 1:
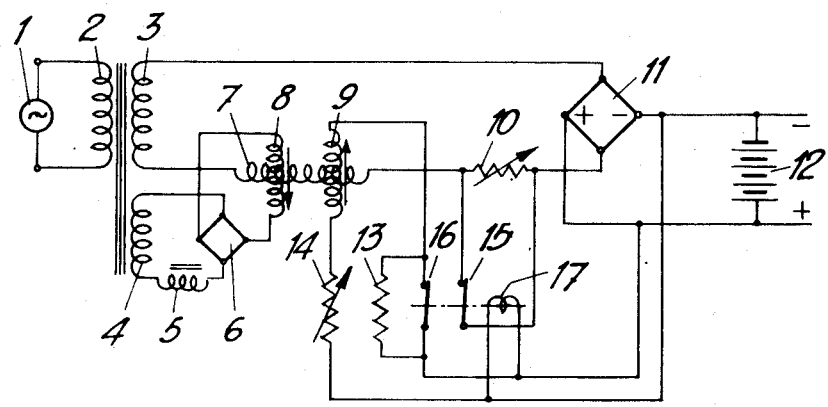
Fig. 1 is a circuit diagram of a preferred embodiment of my invention.

As shown in Fig. 1 a source of alternating current 1 is connected to the primary winding 2 of a transformer having two secondary windings 3 and 4. Connected in series with secondary winding 3 is a dry rectifier 11, an A. C. winding 7 of a D. C. excited reactor and a resistance 10. Connected to the D. C. terminals of rectifier 11 is an accumulator 12. Said reactor comprises two opposing D. C. windings 8 and 9 the latter of which is connected to the D. C. terminals of rectifier 11 over resistances 13 and 14. Also connected to the D. C. terminals of rectifier 11 is a voltage responsive relay 17 the contacts 15 and 16 of which in the deenergized condition of relay 17 shortcircuit the respective resistances 10 and 13. Winding 8 is traversed by direct current from rectifier 6 the A. C. terminals of which over a choke coil 5 are connected to secondary winding 4.

The operation in charging the accumulator 13 will now be described in greater details with reference to the curves illustrated in Fig. 2. In starting the charging the voltage of the battery may be assumed to have the value A and the voltage relay 17 is then deenergized. Thus, the rectifier delivers full charging current D. The charging takes place according to curve E corresponding to maximum D. C. excitation until the battery is completely charged and the voltage has reached the value B. At this voltage relay 17 operates and as a result the current in winding 9 by means of resistances 13 and 14 now connected in circuit is reduced to such a value that the exciting ampere-turns of windings 8 and 9 wil become approximately equal. Thus, the resulting D. C. excitation of the reactor will obtain a very low value and the reactor consequently passes a minimum of current. Moreover, relay 17 by opening contact 15 connects resistance 10 in circuit whereby the charging current will be reduced still further to a value C corresponding to the maintenance current for the accumulator amounting to some hundreds milliamperes. The voltage of the battery is then automatically held at the proper value which for a lead battery is about 2.15 volts/cell approximately corresponding to the value A in Fig. 2.

The maximum charging current can be adjusted by resistance 14 and the maintenance current by resistance 10.

The D. C. winding 8 has also for its object to compensate for variation of the supply voltage. When this voltage increases the excitation by winding 8 increases. Thus, the resulting D. C. excitation of the reactor decreases and reduces the increase of the charging current otherwise occuring. Choke coil 5 which is connected in circuit at the A. C. side of the rectifier 6 and the point of operation of which lies above the knee of the magnetizing curve serves to amplify the action of variations of the supply voltage.

Figure 2:
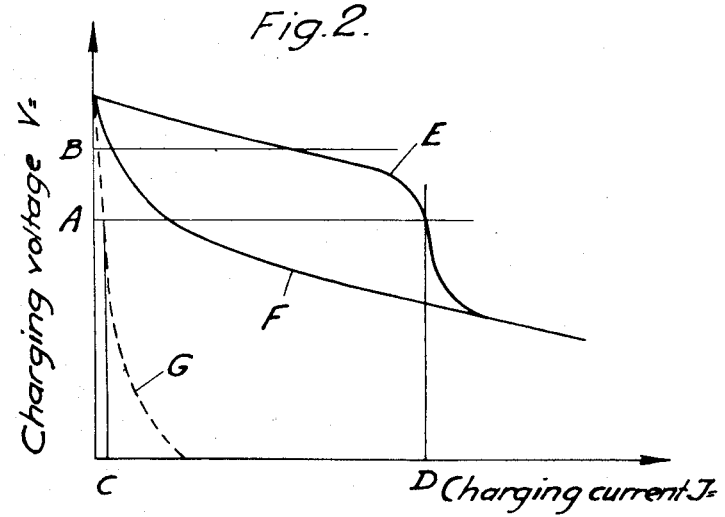
Fig. 2 shows a plurality of curves referred to in the following in connection with the description of the operation of my improved charging system.

As may be seen from Fig. 2 a reactor device which without series connection of resistance 10 would be adapted to restrict to equal maintenance current must be proportioned to regulate with zero D. C. excitation according to a current characteristic G involving a considerable overproportioning of the reactor with respect to the proportioning according to the invention in which regulation takes place according to curve F in zero D. C. excitation.

The arrangement according to the invention can be constructed in many ways differing from that illustrated without departing from the spirit of the invention.

What I claim is:

1. A system for charging a storage battery from alternating current comprising a source of alternating current, a rectifier having its input terminals connected in circuit with said source, a reactance coil and a resistance connected in series with said source, the output terminals of the rectifier being connected to the battery terminals, a pair of exciting windings on said reactance coil with separate means for passing direct current through each winding and automatic means controlled by the voltage of the battery for varying the direct current through one of the exciting windings.

2. A system for charging a storage battery from alternating current comprising a source of alternating current, a rectifier having its input terminals connected in circuit with said source, a reactance coil, and a resistance connected in series with said source, the output terminals of the rectifier being connected to the battery terminals, a pair of windings on said reactance coil for direct current excitation, a pair of resistance units connected in circuit with one of said exciting windings and the battery, one of said units being normally short circuited and means responsive to the voltage of the battery for removing said short circuit.

3. A system for charging a storage battery from alternating current comprising a source of alternating current, a rectifier having its input terminals connected in circuit with said source, a reactance coil, and a resistance connected in series with said source, the output terminals of the rectifier being connected to the battery terminals, a pair of windings on said reactance coil for direct current excitation, a pair of resistance units connected in circuit with one of said exciting windings and the battery, one of said units as well as said first mentioned resistance being normally short circuited, and means responsive to the voltage of the battery for removing both of said short circuits.

4. A system for charging a storage battery from alternating current comprising a source of alternating current, a dry plate rectifier having its input terminals connected in circuit with said source, a reactance coil and a resistance connected in series with said source, the output terminals of the rectifier being connected to the battery terminals, a pair of windings on said reactance coil for direct current excitation, a pair of resistance units connected in circuit with one of said exciting windings and the battery, one of said units being adjustable, the other unit being normally short circuited simultaneously with said first mentioned resistance, and relay means responsive to the voltage of the battery near its fully charged state for simultaneously removing both short circuits.

5. A system for charging a storage battery from alternating current comprising a source of alternating current, a rectifier having its input terminals connected in circuit with said source, a reactance coil and a resistance connected in series with said source, the output terminals of the rectifier being connected to the battery terminals, a pair of exciting windings on said reactance coil, rectifying means having its input terminals connected through a choke coil to said source while its output terminals are connected to one of said exciting windings, the other exciting winding being connected across the battery in circuit with an adjustable resistance and a normally short circuited resistance and a voltage responsive device operated by the battery toward the end of its charge for removing said short circuits.

6. A system for charging a storage battery from alternating current comprising a source of alternating current, a rectifier having its input terminals connected in circuit with said source, a reactance coil and a resistance connected in series with said source, the output terminals of the rectifier being connected to the battery terminals, a pair of exciting windings on said reactance coil, rectifying means having its input terminals connected through a choke coil to said source while its output terminals are connected to one of said exciting windings, the other exciting winding being connected across the battery in circuit with an adjustable resistance and a normally short circuited resistance said first mentioned resistance, being adjustable and also normally short circuited, and relay means operated by the battery voltage toward the end of its charge for removing both of said short circuits.

GUNNAR WINKLER.

REFERENCES CITED

The following references are of record in the file of this patent:

UNITED STATES PATENTS

| Number | Name | Date |
| --- | --- | --- |
| 1,791,156 | Beetem | Feb. 3, 1931 |
| 2,114,827 | Aggers | Apr. 19, 1938 |
| 1,319,215 | Foote | Oct. 21, 1919 |
| 1,786,280 | Woodbridge | Dec. 23, 1930 |
| 1,852,799 | Cheeseman | Apr. 5, 1932 |
| 1,916,307 | Gilson | July 4, 1933 |
| 1,995,652 | Reichard | Mar. 26, 1935 |
| 2,082,607 | Amsden | June 1, 1937 |
| 2,085,061 | Aggers | June 29, 1937 |
| 2,096,440 | Wetzer | Oct. 19, 1937 |
| 2,104,603 | Agnew et al. | Jan. 4, 1938 |
| 2,346,997 | Priest | Apr. 18, 1944 |